US006738554B2

(12) United States Patent
Daoud et al.

(10) Patent No.: US 6,738,554 B2
(45) Date of Patent: May 18, 2004

(54) DOUBLE HELICAL-S FIBER TRAY

(75) Inventors: Bassel H. Daoud, Parsippany, NJ (US);
Jason A. Kay, Robbinsville, NJ (US);
David S. Kerr, Morris Plains, NJ (US);
Ivan Pawlenko, Holland, PA (US);
Larry Samson, Langhorne, PA (US);
Ronald Marchisin, Toby Hanna, PA
(US)

(73) Assignee: Lucent Technologies Inc., Murray Hill, NJ (US)

( * ) Notice: Subject to any disclaimer, the term of this patent is extended or adjusted under 35 U.S.C. 154(b) by 134 days.

(21) Appl. No.: 09/850,442

(22) Filed: May 7, 2001

(65) Prior Publication Data

US 2002/0164144 A1 Nov. 7, 2002

(51) Int. Cl.[7] ................................................ G02B 6/00
(52) U.S. Cl. ...................................................... 385/135
(58) Field of Search ................... 379/399, 412, 379/413, 442; 439/49, 133, 709, 718, 719; 385/134, 135, 136; 248/65, 68.1

(56) References Cited

U.S. PATENT DOCUMENTS 5,093,885 A * 3/1992 Anton ........................ 385/134
5,100,221 A * 3/1992 Carney ....................... 385/135
5,363,440 A    11/1994 Daoud
5,781,686 A * 7/1998 Robinson et al. ........... 385/135
5,790,741 A * 8/1998 Vincent et al. ............. 385/135
RE35,929 E    10/1998 Daoud
6,095,461 A * 8/2000 Daoud et al. .................. 348/65
6,396,990 B1 * 5/2002 Ehn et al. ................... 385/135

FOREIGN PATENT DOCUMENTS

EP            0288808    * 4/1988    ................. 385/135

* cited by examiner

Primary Examiner—Jean F. Duverne

(57) ABSTRACT

A high-density, small fiber optic enclosure permits the cross-connection and interconnection of optical fibers, through the use of an open-faced compact layering technique. The optical fiber enters an aperture in the bottom of the enclosure which includes a first section attachable to a wall surface, and a second section connected to the first enclosure section by a hinge. The first enclosure section includes an optical fiber splice holder and a plurality of hooks and clips for holding the optical fibers. The second enclosure section includes a plurality of hooks and clips also. The fibers enter the first section, are connected to the hooks and clips, and cross over to the second section and return to the first section and ultimately pass through an exit aperture in such a fashion as to form a plurality of FIG. 8 layers. If the optical fibers are not shielded, it is possible to use two opposing S-shaped fiber tubes to protect them at the crossover between the first and second enclosure.

8 Claims, 4 Drawing Sheets

DOUBLE HELICAL-S FIBER TRAY

BACKGROUND OF THE INVENTION

1. Field of the Invention

The invention relates to an enclosure for protecting optical fibers which include a splice section therein.

2. Description of Related Art

Prior art devices are known for the support and protection of optical fibers and the splices therein. See, for example, U.S. Pat. No. 5,363,440 and reissue U.S. Pat. No. 035,929. Frequently such devices simply coil optical fibers in an enclosure making them very difficult to sort and follow for interconnection and cross-connection referencing. It is also very important to provide sufficient slack so that an optical fiber can be respliced if a splice either becomes bad, or for some reason, was not properly made in the first place. Another problem encountered in the prior art is that an optical fiber must maintain a radius greater that 1½ inches or signal degradation may occur. Moreover, if the fiber is not shielded, it can be damaged during the opening and closing of the storage cabinet.

It is clear from the foregoing that there is a need for an optical fiber enclosure which can protect an optical fiber splice and yet provide sufficient slack for future repair purposes and, at the same time, accommodate a significant number of different fibers in a way that permits the fibers to be interconnected and cross-connected readily. It was in the context of the foregoing need that the present invention arose.

SUMMARY OF THE INVENTION

Briefly described, the invention comprises a high-density, small fiber optic enclosure that permits optical fibers, and their splices, to be layered in a FIG. 8-lite configuration. The optical fibers enter the enclosure through a first or entrance aperture in the bottom and proceed onto hooks and clips around the interior periphery thereof. A resilient splice holder snugly receives the splice section. From there the optical fiber crosses over a hinged section and loops around the hooks and clips in the opposite direction and then crosses back to the first enclosure section and out a second, or exit, aperture. Up to 10, and possibly up to 24 or more, optical fibers including splice sections can be layered upon each other in a similar fashion, each creating a FIG. 8, or butterfly-like, pattern on top of the other optical fibers. The hooks and clips which hold on to the optical fibers are spaced in such a fashion as to guarantee that the turn radius of any individual fiber is always greater than 1½ inches—the minimum acceptable turn radius for an optical fiber. The cabinet or enclosure can then be easily closed and the optical fibers at the hinged section do not interfere with each other because they overlap. This technique permits the layers on both sides to be exposed when the enclosure is opened thereby facilitating work between the layers. In this way installation and repair time is reduced by permitting the installer to be able to view and work on both layers at the same time. It further eliminates the time consuming and frustrating practice of having to flip between various layers to follow fibers for interconnection and cross-connection referencing purposes.

The foregoing is an acceptable approach if the optical fibers are protected with an appropriate resilient plastic coating. If, on the other hand, the optical fibers are not protected by such a coating, then the invention can be supplemented by using pairs of opposing S-shaped hollow Fiber Tubes to shield the naked optical fibers at the hinge section of the enclosure. The two opposing S-shaped hollow fiber tubes look like a large X at the hinge section and prevent damage to the optical fibers at that location.

The invention may be more fully understood by reference to the following drawings.

DETAILED DESCRIPTION OF THE PREFERRED EMBODIMENT

During the course of this description like numbers will be used to identify like elements according to the different figures that illustrate the invention.

Figure 1:
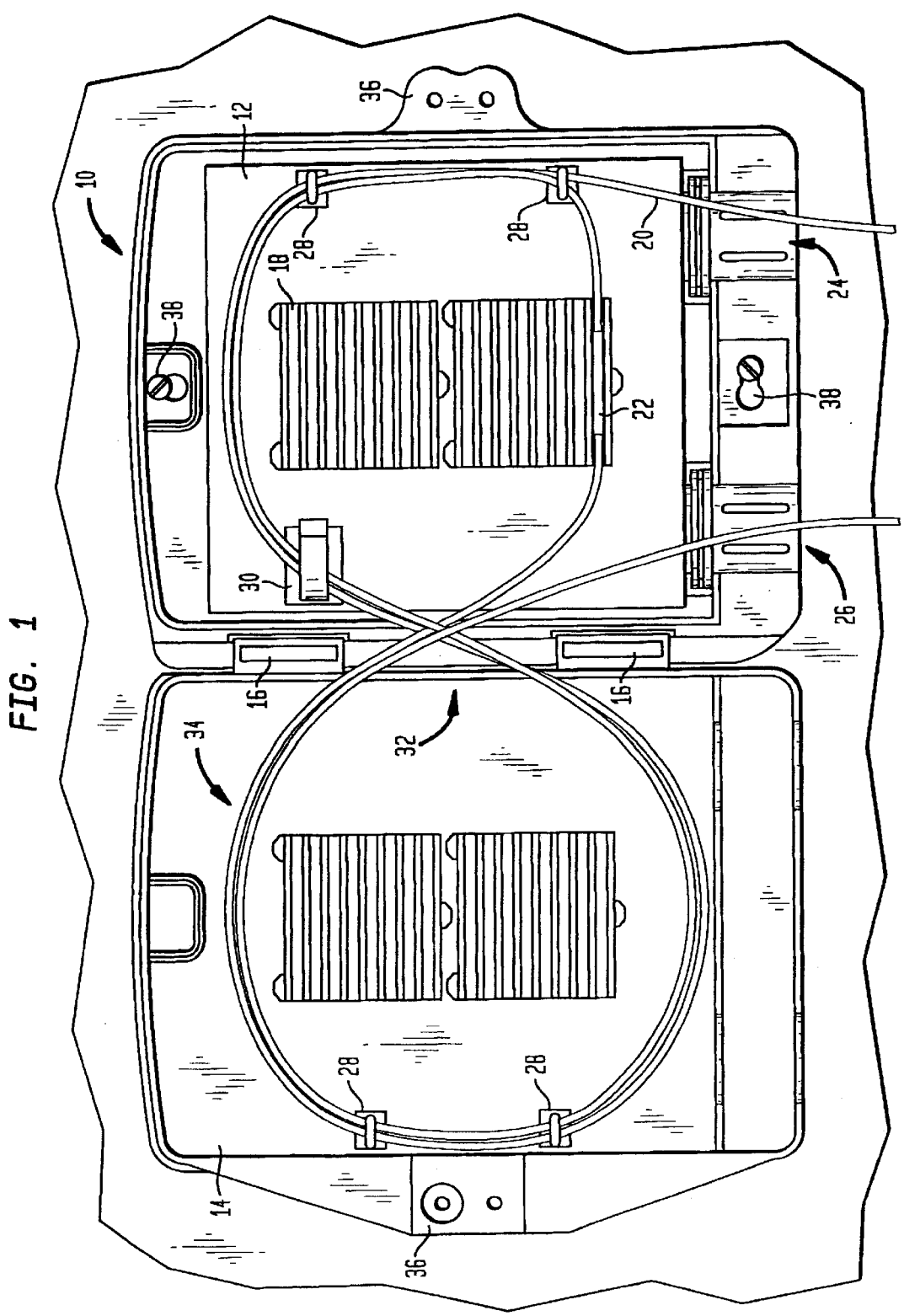
FIG. 1 illustrates the enclosure invention according to the preferred embodiment thereof shown in the open state with plastic shielded fibers overlapping in layers in a FIG. 8 formation.

The preferred embodiment of 10 of the invention is illustrated in its open state in FIG. 1. The enclosure invention 10 comprises a first enclosure section 12 attached to a second enclosure section 14 by an intermediate hinge section 16. A wall mounting hole or aperture 38 is located at the top and bottom of the first enclosure section 12. Wall mounting hole 38 permits a nail or screw to be driven therethrough so that it can be attached to a flat surface such as a wall 44 or a cabinet.

The interior on the first enclosure section 12 includes a resilient splice holder 18 having a plurality of splice receiving grooves therein. Splice holder 18 is made of well known material and is intended to receive an optical fiber splice 22 in a snug but releasable fashion.

Optical fibers 20 enter the enclosure 10 through an entrance aperture 24 which is formed by a pair of semicircular cut outs at the bottom portion of the first and second enclosure sections 12 and 14, respectively. A similar exit aperture 26 is also formed at the bottom of the first and second enclosure 12 and 14 so that the optical fiber 20 can exit the enclosure 10. Optical fibers 20 enter through entrance aperture 24 and are held in position by hooks 28 and clips 30 attached to the interior peripheries of the first and second enclosure sections 12 and 14 as illustrated in FIG. 1. An optical fiber 20 is initially attached to hooks 28, loops around optical fiber splice holder 18 and then across the splice holder 18 in such a fashion that the optical fiber splice 22 is held snuggly in one of the 10 grooves of the splice holder 18. The optical fiber 20 then continues around and across the hinge section 16 where it forms a loop in the opposite direction, again held in place by hooks 28 and clips 30, whereupon it returns and re-crosses the hinge section 16 at overlap portion 32 and then either exits through exit aperture 26 or takes another lap around the interior of the enclosure unit 10. It will be noted that strands of optical fiber 20 laid into the enclosure form a FIG. 8 shape 34, or butterfly shape, when organized in a cabinet 10 in this manner. Up to 10 individual strands of optical fiber 20 may be placed in the enclosure 10, limited primarily by the number of grooves in the splice holder 18 which, according to the embodiment illustrated in FIG. 1, can be 10. It is also possible, according an alternative embodiment not shown, to add an additional splice holder 18 in the interior of the second enclosure section 14 in a manner similar to that shown with regard to splice holder 18 illustrated in FIG. 1. Accordingly, it would be theoretically possible to accommodate up to 20, and in some cases even as many as 24, individual optical fibers 20 and optical fiber splices 22 in such an enclosure 10.

Figure 2:
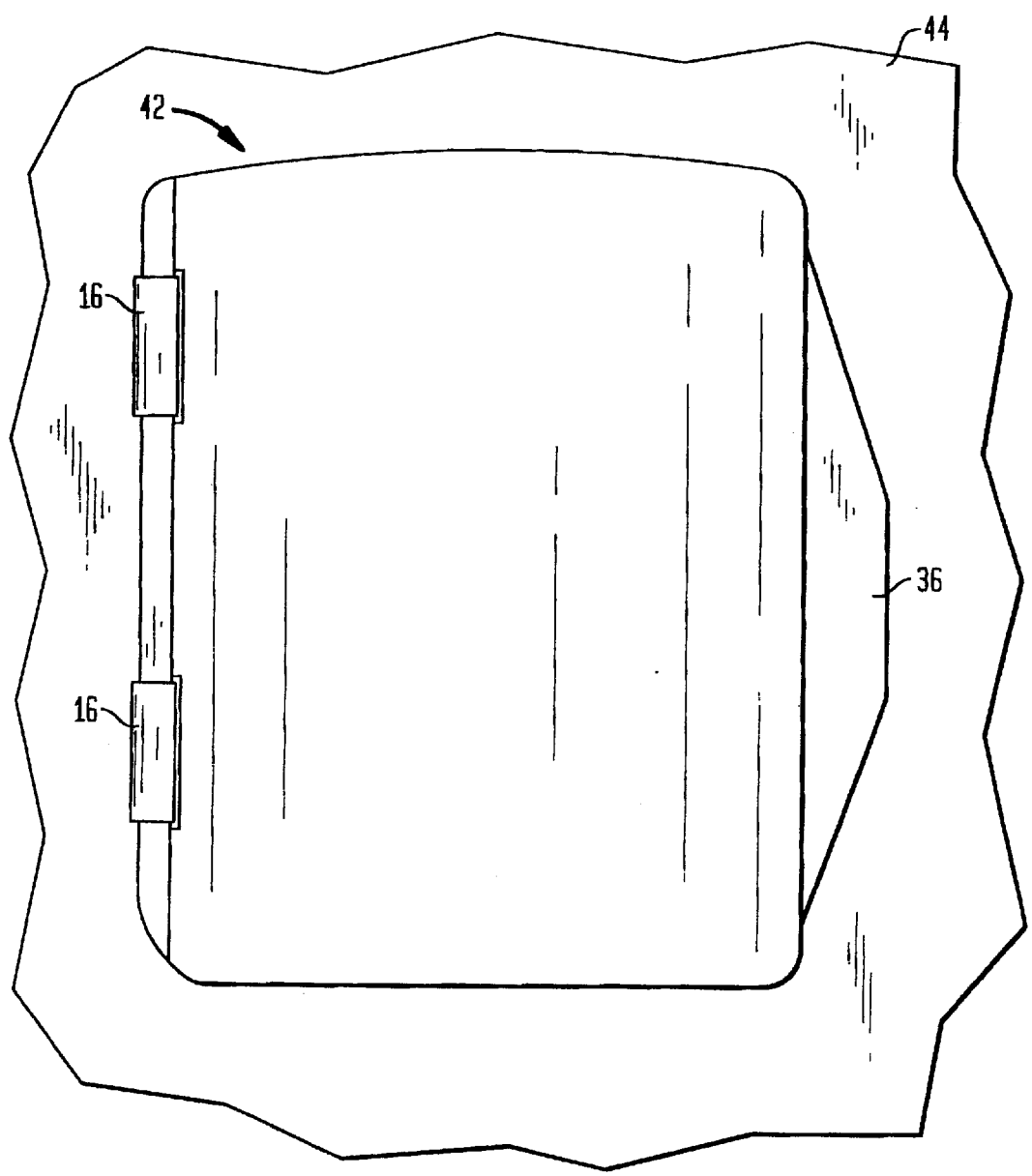
FIG. 2 illustrates the enclosure invention shown in FIG. 1 mounted on a flat wall-like surface.

FIG. 2 illustrates the enclosure invention 10 in the closed state 42. In the closed state 42 the twin locking tabs 36, located respectively on the outer most edges of the first and second enclosures sections 12 and 14, are connected together, typically by a screw which may also penetrate the wall 44 upon which the enclosure is mounted.

Figure 4:
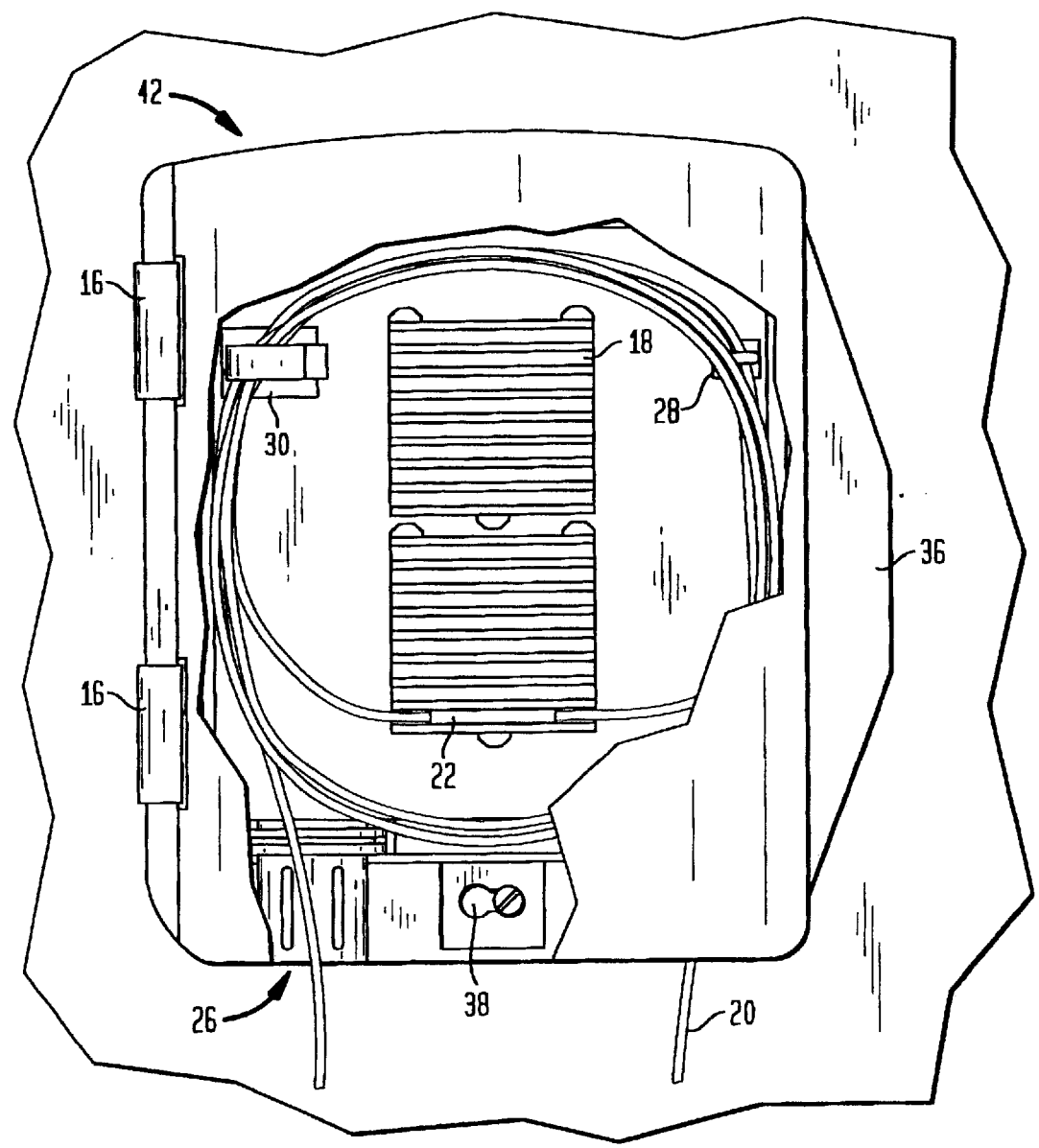
FIG. 4 illustrates in a partial cross sectional fashion the manner in which the optical fiber loops safely overlap each other in layers when the enclosure is in the closed state as shown in FIG. 2.

FIG. 4 is a partial cross sectional view of the invention 10 the closed state 42, as shown in FIG. 2, but illustrating the manner in which the loops that comprise the upper and lower portions of the FIG. 8 sections, comfortably overlap, or layer each other, when the enclosure 10 is closed. The hooks 28 and circular clips 30 keep the two loops of the FIG. 8 in a configuration such that the bending radius is never smaller than 1½ inches, the minimum bending radius after which point the signals become distorted, or unacceptably attenuated, or damaged to the optic fibers 20 is possible. Because the two loops of the FIG. 8's proceed in opposite directions, the two loops comfortably overlap and layer each other when the enclosure 10 is closed. The foregoing also permits the unit 10 to store a substantially larger amount of slack than is possible with prior art devices and organized in such a fashion that it is relatively easy to separate the layers so that optical fibers 20 can be respliced or otherwise manipulated.

Figure 3:
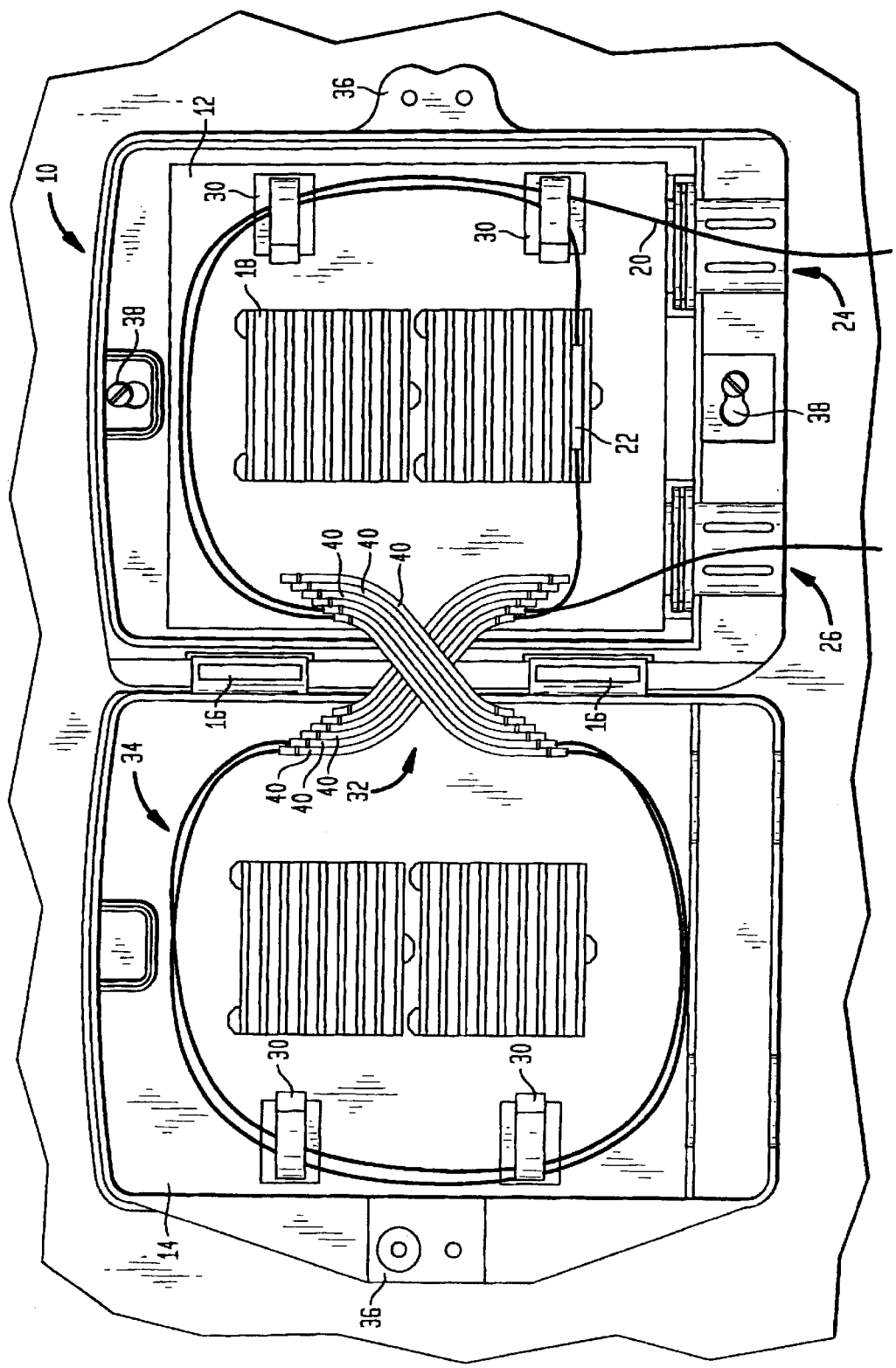
FIG. 3 illustrates an alternative embodiment of the invention shown in FIGS. 1 and 2 in which unshielded optical fibers are protected at the crossover, hinge section by a plurality of opposing S-shaped hollow fiber tubes.

The preferred embodiment of the invention 10 is illustrated in the context of optical fibers that are preferably shielded with conventional materials such as plastic to protect them from wear and abrasion. It is also possible to employ the same technique and structure for unshielded optical fiber, however, care must be taken to make sure that the fibers are protected at the crossover area 32 adjacent the hinge section 16. In order to accomplish this, pairs of opposing S shaped hollow fiber tubes 40 are threaded over the optical fibers 20 and held in position by clips 30 on opposite sides of the hinge section 16 so as to form a plurality of large X-like crossings. The S shaped hollow fiber protective tubes or sleeves 40 form a substantially straight line when the enclosure 10 is in the closed state 42 as shown in FIG. 2. Once the enclosure 10 is open, as illustrated in FIG. 3, the fibers 20 are bent less than their minimum bend radius of 1½ inches. This Double-S concept is fundamental to the objective of increasing the density of the unit 10. It permits the optical fibers 20 to cross the enclosure's bookbinding style hinge 16 without of fear of crimping or exceeding the minimum bend radius that degrades performance.

The invention described has several advantages over the prior art. First, the open-faced compact layering technique allows for an increase in the density of the amount of slack material that can be accommodated through the use of efficient layering. Second, the FIG. 8 layering technique allows for reduced installation and service time, because both layers are exposed to facilitate work between the layers when the cabinet is in its open position. Third, the invention and layering technique also allows one side of the enclosure 10 to be dedicated to slack storage while the other side allows for splicing. This reduces the clutter around the work area, which reduces the amount of time the installer spends servicing the enclosure. Forth, but not the least, the enclosure according to the embodiment 10, also facilitates connections on one layer or cross connections with other layers.

The alternative embodiment of the invention 10 shown in FIG. 3, which comprises the use of Double-S shaped hollow fiber optic sleeves 40, also has some advantages over the prior art. First, the Double-S technique using the fiber optic tubes or sleeves 40 allows for an increase of density through the use of layering. Second, when the enclosure 10 is open, the shape minimizes fiber stress by allowing the individual tubes, or sleeves, 40 to naturally take a minimal bend. Third, when the enclosure 10 is closed, the nature of the individual tubes 40 allows them to slide along the tray holder, effectively expanding, to a straight line. Fourth, the substantially straight line of a tube greatly reduces transmission losses, thereby increasing performance. Fifth, and last, the Double-S holder 40 is integrated into the splice holders as well as the slack tray, therefore fewer parts are needed and a resulting reduction in inventory can be realized.

While the invention has been described with reference to a preferred embodiment thereof, it will be appreciated by those of ordinary skill in the art that modifications can be made to the structure and technique of the invention 10 without departing from the spirit and scope thereof. For example, while the disclosure preferably describes the layering of one FIG. 8 per optical fiber 20, it is possible that 2 or 3 layerings of the same fiber 20 could take place if additional slack is desired. In addition, while the preferred embodiment 10 accommodates up to 10 optical splices 22, in practice, between 10 and 24 optical splices 22 can be comfortably accommodated in a cabinet 10, especially if in an additional splice holder 18 is located on the interior of the second enclosure 14. Furthermore, while the preferred embodiment of the invention 10 is used in the context of jacketed cable, it is clear that non-jacketed cable can also be accommodated especially if hollow fiber optic protective tubes or sleeves 40 are employed as shown in FIG. 3.

We claim:

1. An enclosure apparatus for protecting and providing slack to optical fibers having a splice portion therein, said apparatus comprising:

a first enclosure section having an interior surface and an exterior surface;

a splice holder means for holding at least one splice portion, said splice holder means being attached to said interior surface of said first enclosure section;

a second enclosure section for mating with said first enclosure section, said second enclosure means also having an interior surface and an exterior surface;

hinge means for connecting said first and second enclosure means together in a hinged manner so that said enclosure apparatus can rotate about said hinge means from an open position to a closed position;

first optical fiber holding means located on said interior surface of said first enclosure section for holding in a loop shaped pattern said optical fibers; and, second optical fiber holding means located on said interior surface of said second enclosure section for holding in a loop shaped pattern said optical fibers, wherein said enclosure apparatus can move from said open position to said closed position without damaging said optical fibers held by said first and second optical fiber holding means.

2. The apparatus of claim 1 wherein said first and second optical fiber holding means hold said optical fibers in a loop shaped pattern wherein the bending radius of each loop is at least 1½ inches.

3. The apparatus of claim 2 wherein said optical fibers when layered in said enclosure apparatus in the open position describes a substantially flat 8 shape having two loop sections and wherein, when said enclosure is closed, said two loops of said 8 shape overlap each other.

4. The apparatus of claim 3 herein said first enclosure section includes means for mounting said enclosure apparatus to a substantially flat surface.

5. The apparatus of claim 4 further including an enclosure locking means for locking said first enclosure section in said closed position with respect to said second enclosure section.

6. The apparatus of claim 5 wherein said optical fiber holding means comprise hook shaped means.

7. The apparatus of claim 6 further including:

hollow tubing means for loosely surrounding said optical fibers as they pass and cross over each other from said first enclosure section to said second enclosure section and wherein said hollow tubing means assumes a generally S shape when said enclosure apparatus is in the open position.

8. The apparatus of claim 6 wherein said fibers comprise plastic coated fibers.

* * * * *